United States Patent
Kong

(10) Patent No.: US 9,774,544 B2
(45) Date of Patent: Sep. 26, 2017

(54) INDUSTRIAL CONTROL DEVICE AND METHOD FOR INSERTION AND REMOVAL OF A MODULE UNDER POWER WITHOUT INTERRUPTION

(71) Applicant: Chew Earn Kong, Singapore (SG)

(72) Inventor: Chew Earn Kong, Singapore (SG)

(73) Assignee: Rockwell Automation Asia Pacific Business Ctr. Pte., Ltd., Singapore (SG)

( * ) Notice: Subject to any disclaimer, the term of this patent is extended or adjusted under 35 U.S.C. 154(b) by 67 days.

(21) Appl. No.: 14/585,523

(22) Filed: Dec. 30, 2014

(65) Prior Publication Data

US 2016/0191418 A1 Jun. 30, 2016

(51) Int. Cl.
| | |
|---|---|
| *H04L 12/931* | (2013.01) |
| *H04L 12/24* | (2006.01) |
| *G06F 13/40* | (2006.01) |
| *G05B 19/414* | (2006.01) |
| *G05B 7/02* | (2006.01) |
| *H04L 12/933* | (2013.01) |
| *G05B 19/042* | (2006.01) |

(52) U.S. Cl.
CPC .......... *H04L 49/15* (2013.01); *G05B 7/02* (2013.01); *G05B 19/0423* (2013.01); *G05B 19/414* (2013.01); *G06F 13/409* (2013.01); *H04L 41/12* (2013.01); *H04L 41/24* (2013.01); *H04L 49/40* (2013.01); *H04L 49/65* (2013.01); *G05B 2219/15078* (2013.01); *G05B 2219/15119* (2013.01); *G05B 2219/25464* (2013.01)

(58) Field of Classification Search
CPC ........ G05B 7/02; G05B 15/02; G05B 19/045; G05B 19/414; H04L 41/12; H04L 41/24; H04L 49/15; H04L 49/40; H04L 49/65
See application file for complete search history.

(56) References Cited

U.S. PATENT DOCUMENTS

| | | | |
|---|---|---|---|
| 4,658,333 A | 4/1987 | Grimes | |
| 5,028,809 A * | 7/1991 | Watanabe | .............. H02H 9/004 307/134 |
| 5,455,911 A * | 10/1995 | Johansson | ............ G05B 19/054 700/1 |
| 6,349,235 B1 | 2/2002 | Gibart et al. | |
| 7,917,675 B2 | 3/2011 | Murphy et al. | |
| 8,246,358 B2 | 8/2012 | Molnar et al. | |
| 8,264,852 B2 | 9/2012 | Nelson et al. | |

(Continued)

OTHER PUBLICATIONS

European Search Report, dated May 30, 2016, Munich, 4 pages.

*Primary Examiner* — Timothy J Weidner
(74) *Attorney, Agent, or Firm* — Fay Sharpe LLP

(57) ABSTRACT

Disclosed is an industrial control device including a point-to-point backplane/point module architecture providing RIUP (Removal and Insertion Under Power) functionality where data communications between modules is maintained after the removal of a point module from the backplane. According to an exemplary embodiment, a backplane includes a plurality of bypass switches controlled by respective point modules, whereby data communicated bypass a removed point module interface and point-to-point data communications are provided to an inserted point module after an initial routine is executed by a microcontroller associated with the inserted point module.

20 Claims, 13 Drawing Sheets

(56) References Cited

U.S. PATENT DOCUMENTS

| | | |
|---|---|---|
| 8,308,490 B2 | 11/2012 | Molnar et al. |
| 2012/0221155 A1 | 8/2012 | Miles et al. |
| 2014/0226460 A1* | 8/2014 | Kretschmann ....... G05B 19/058 370/218 |
| 2014/0310441 A1 | 10/2014 | Klughart |

* cited by examiner

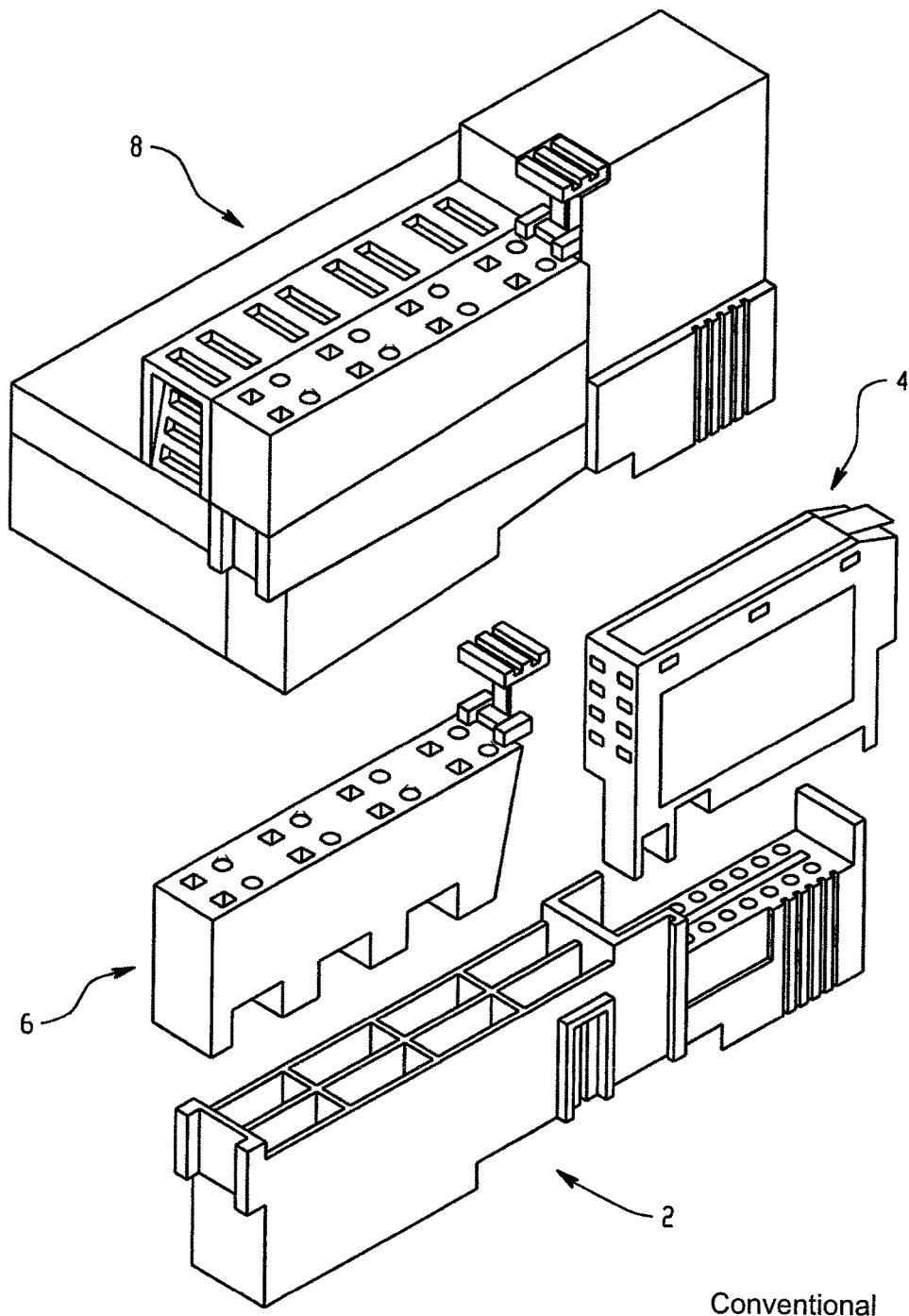
Conventional
Fig. 1

INDUSTRIAL CONTROL DEVICE AND METHOD FOR INSERTION AND REMOVAL OF A MODULE UNDER POWER WITHOUT INTERRUPTION

BACKGROUND INFORMATION

The subject matter disclosed herein relates to industrial process control systems, methods and devices. Specifically, the disclosed subject matter relates to industrial control devices which include a plurality of modules, such as, but not limited to, I/O (Input/Output) modules, where it is desired to remove and insert a module into a backplane component of the control device without interrupting, or minimally interrupting, data communications between other modules attached to the backplane.

FIG. 1 shows a conventional point module arrangement for an industrial process control device. As shown, the device includes a mounting base 2, a removable terminal block (RTB) 6, a point adaptor 8 and a point module 4. Applications of this architecture include industrial controllers, distributed I/O controllers, machine controllers, field devices, etc. Multiple point modules can be attached adjacently to provide a multi-module system, where the mounting bases incorporate an active backplane which provides power to the point modules and includes the necessary interface to provide data communications between the point modules, as well as data communications with the point adapter which communicates with an external network, other device, and/or industrial controller, etc.

With reference to FIG. 2, illustrated is a conventional point-to-point backplane module arrangement for a controller including a plurality of I/O modules 22, 24 and 26, and an Ethernet communication adapter 20. As shown, the arrangement includes a point-to-point backplane including mounting bases 28, 30 and 32 for each of the I/O modules 22, 24 and 26, respectively. Importantly, if an I/O module is disengaged, i.e., removed, from the backplane, data communications connectivity is broken between the modules adjacent to the removed module, as is shown with I/O module 24 detached from mounting base 30 in FIG. 2.

With reference to FIG. 3, illustrated is a conventional multi-point backplane module arrangement for a controller including a plurality of I/O modules 40, 42 and 44 and an Ethernet communication adapter 20. As shown, the arrangement includes a multi-point backplane including mounting bases 46, 48 and 50 for each of the I/O modules 40, 42 and 44, respectively. Importantly, if an I/O module is removed or inserted, i.e., removed from the backplane or inserted to the backplane, data communications connectivity is maintained with the downstream I/O modules because a multi-point communications protocol, e.g., CAN (Controller Area Network) (DeviceNet), is used for data communications between the I/O modules. For example, as shown in FIG. 3, I/O module 40 is removed from mounting base 46 which does not interrupt communications between point adapter 20, I/O module 42 and 44.

A point-to-point backplane arrangement, as shown in FIG. 2, typically can achieve higher data communication rates, as compared to a multi-point backplane arrangement, as shown in FIG. 3. For example, a point-to-point Ethernet based data communication network typically achieves 100 Mbps-1 Gbps, and a multi-point based data communication network typically achieves 1 Mbps for a CAN bus based network and 50 Mbps for a RS485 based network. Therefore, from a data communication speed perspective, it is desirable to use a point-to-point backplane arrangement. However, as discussed above with reference to FIG. 2, a conventional point-to-point backplane arrangement has the disadvantage of not providing RIUP (Removal and Insertion Under Power) functionality while maintaining data communications with modules downstream of a removed point module.

This disclosure and the exemplary embodiments described herein provide a RIUP point-to-point module arrangement with relatively minimum or no loss of data communications with downstream point modules with the removal of a point module from a backplane.

BRIEF DESCRIPTION

In one embodiment of this disclosure, described is an industrial control device comprising: a plurality of I/O (Input/Output) modules, each I/O module including a microcontroller operatively connected to a first data communication channel, a second data communication channel and a RIUP (Removable and Insertion Under Power) control signal line, wherein the first data communication channel, the second data communication channel and the RIUP control signal line include backplane interface contacts; a point-to-point backplane removably coupled to each of the plurality of I/O modules, the backplane including a plurality of bypass data switches, each bypass data switch operatively associated with a respective I/O module control signal line to open and close the bypass data switch and each bypass data switch including a first switch contact operatively associated with the first data communication channel and a second switch contact associated with the second data communication channel, wherein removal of an I/O module from the backplane causes the respective bypass data switch to close and route data communications from the first switch contact to the second switch contact, and the insertion of an I/O module to the backplane causes the respective I/O module microcontroller to execute an initialization routine which outputs a control signal to the bypass data switch to open thereby connecting the backplane first data channel to the respective I/O module first data channel contact exclusive of being routed to the second switch contact and connecting the backplane second data channel to the respective I/O module second data channel contact exclusive of being routed to the first switch contact.

In another embodiment of this disclosure, described is a control module for an industrial device, the control module comprising: a microcontroller operatively connected to a first data communication channel, a second data communication and a RIUP (Removable and Insertion Under Power) control signal line; and a mounting base interface contacts configured to interface the first data communication channel, the second communication channel and the control signal line to an associated mounting base, wherein the microcontroller is configured to execute instructions to control a bypass data switch operatively associated with the control signal line, the bypass data switch operating in a first state to provide point-to-point data communications between two other control modules adjacent to the control module when the control module is removed from the associated mounting base, and a second state to provide point-to-point data communications between the control module and the two other control modules adjacent to the control module when the control module is inserted to the mounting base.

In yet another embodiment of this disclosure, described is a point-to-point backplane for an industrial control device comprising: a plurality of mounting bases configured to removably couple a plurality of respective I/O (Input/Output) modules, each mounting base including a bypass data switch operatively associated with a respective I/O module control signal line to open and close the bypass data switch and each bypass data switch including a first switch contact operatively associated with a first data communication channel and a second switch contact operatively associated with a second data communication channel.

BRIEF DESCRIPTION OF THE DRAWINGS

FIG. 1 is an isometric detail view of a conventional point module arrangement.

DETAILED DESCRIPTION

This disclosure provides a RIUP point-to-point backplane and module architecture to enable relatively minimum or no loss of data communications to other modules, i.e., downstream modules, during an RIUP operation including the removal of a point module from the backplane and the insertion of a point module to the backplane.

Figure 2:
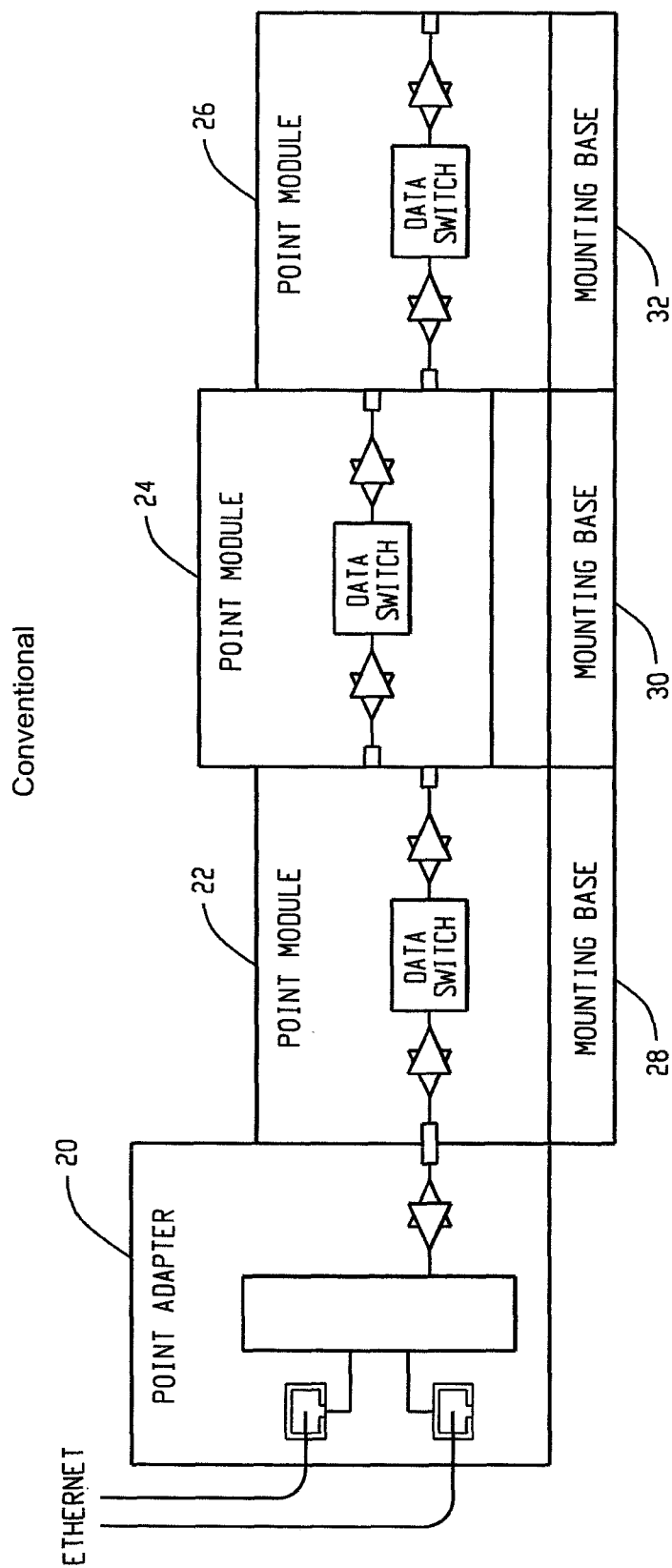
FIG. 2 shows a conventional point-to-point backplane/module arrangement.
Figure 3:
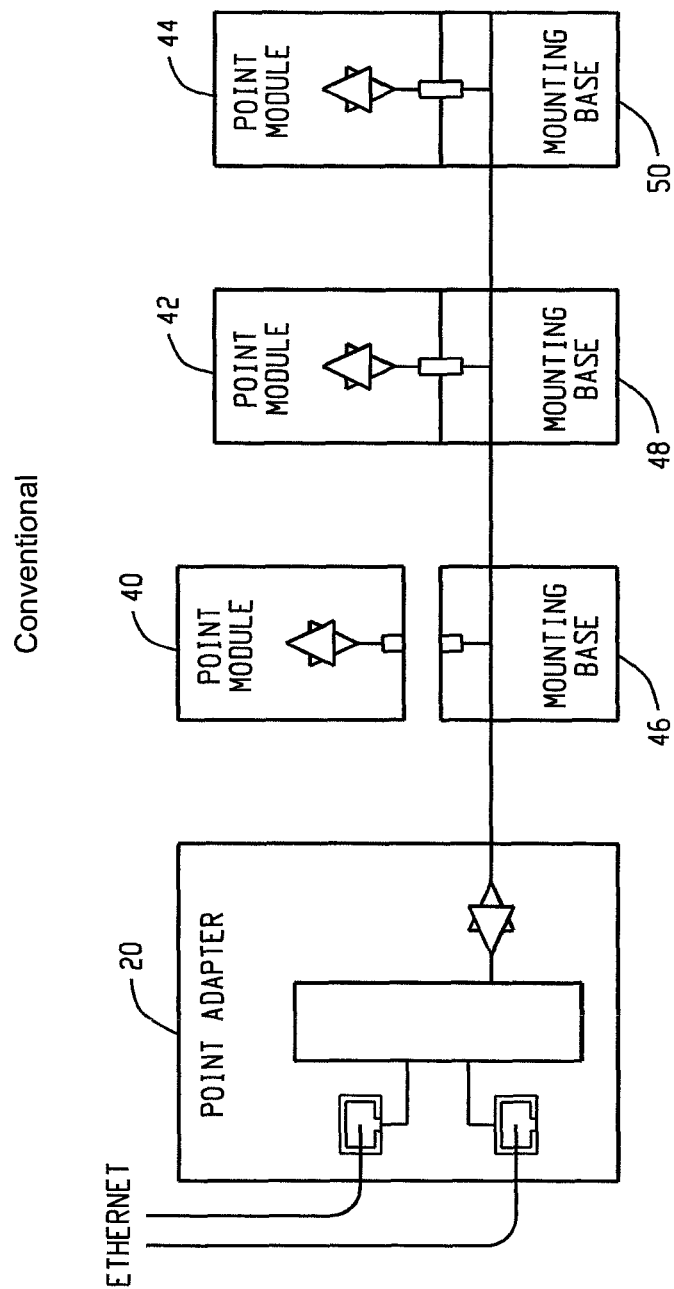
FIG. 3 shows a conventional multi-point backplane/module arrangement.
Figure 4:
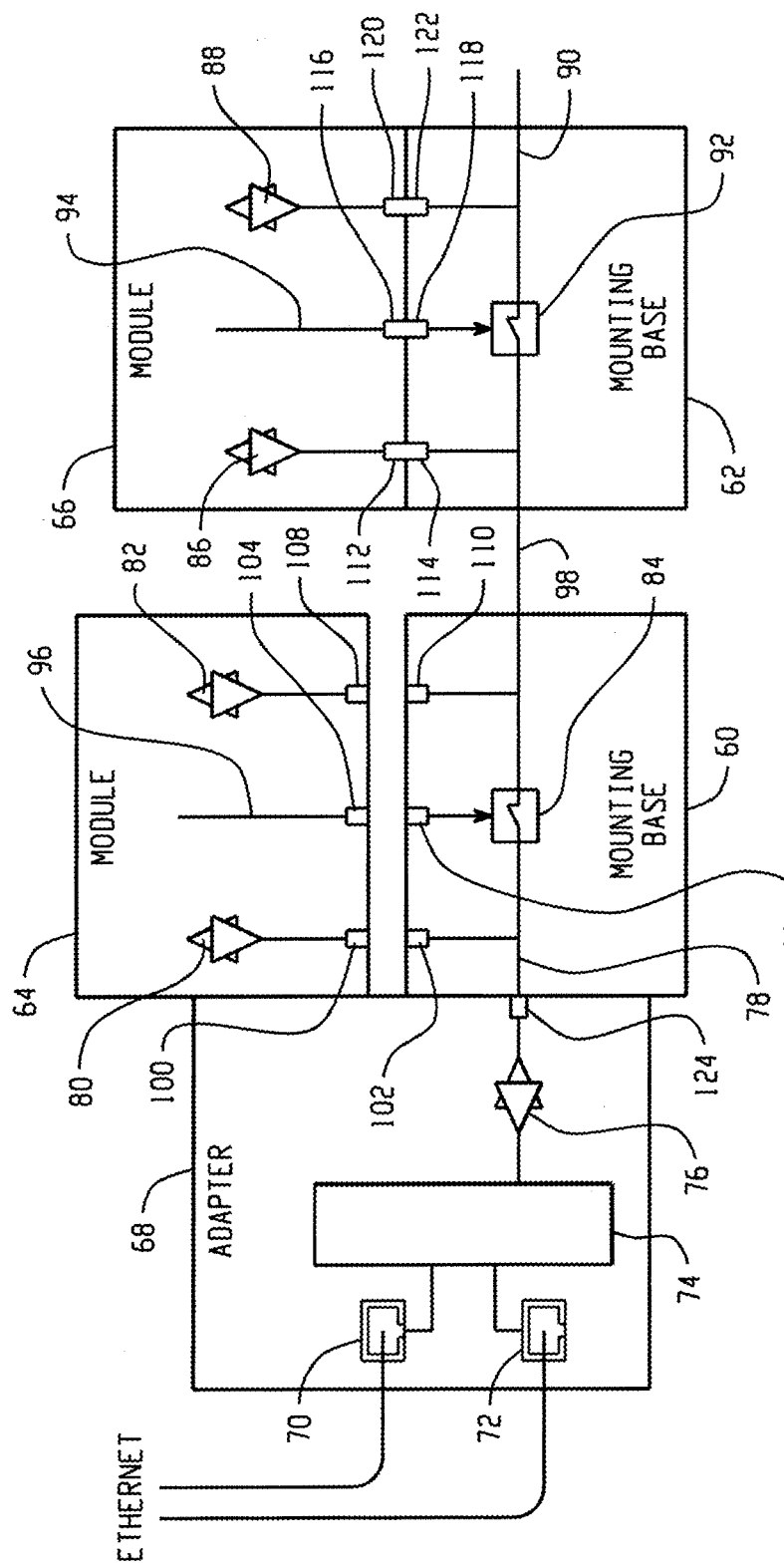
FIG. 4 is a schematic of a point-to-point RIUP backplane/module architecture according to an exemplary embodiment of this disclosure.

The detailed description which follows focuses on a distributed I/O control device, as shown in FIG. 4, including a plurality of modules 64 and 66, such as input modules and/or output modules, an Ethernet adaptor module 68 operatively connected to the plurality of modules 64 and 66 which communicates with an external network and/or other Ethernet enabled device, and mounting bases 60 and 62. However, it is to be understood that the disclosed subject matter and exemplary embodiments described are not limited to a particular type of point module and point adaptor modules and the disclosed point-to-point RIUP architecture provided herein can be applied to other point modules, such as, but not limited to, PLCS (Programmable Logic Controllers), custom field devices, machine controllers, etc.

As shown in FIG. 4, the exemplary distributed I/O control device includes an Ethernet adapter module 68 including Ethernet ports 70 and 72, an Ethernet communication microprocessor 74, transceiver 76, and connector 124, which provides a data communications interface with adjacent mounting base 60.

Mounting bases 60 and 62 communicate via channel 98 and operatively connect to modules 64 and 66 via connectors 102, 106, 110, 114, 118, and 122. A control line operatively associated with connector 106 is operatively associated with bypass switch 84 which controls the routing of data communications between communication channel 78 and 98.

I/O modules 64 and 66 include transceivers 80, 82, 86, and 88, and bypass switch control lines 94 and 96 which control mounting base bypass switches 84 and 92. Connectors 100, 104, 108, 112, 116 and 120 are operatively associated with removal and/or insertion of I/O modules 64 and 66 to mounting bases 60 and 62.

During normal operation of the distributed I/O control device shown in FIG. 4, modules 64 and 66 are connected to mounting bases 60 and 62.

During normal operation of the distributed I/O control device shown in FIG. 4, modules 64 and 66 are connected to mounting bases 60 and 62, respectively, and bypass switches 84 and 92 are open, thereby routing data communications to modules 64 and 66 in a point-to-point fashion. In other words, data communications are routed from transceiver 76 to transceiver 80, via communication channel 78 and connector 102/100, and data communications are routed from transceiver 82 to transceiver 86 via connectors 108/110, communication channel 98, and connectors 114/112.

During an operational mode of the distributed I/O control device shown in FIG. 4 associated with a removed I/O module 64 from mounting base 60, bypass switch 84 is closed, which routes data communications from transceiver 76 to transceiver 86 via communication channel 78, bypass switch 84, communication channel 98 and connectors 114/112.

Figure 5:
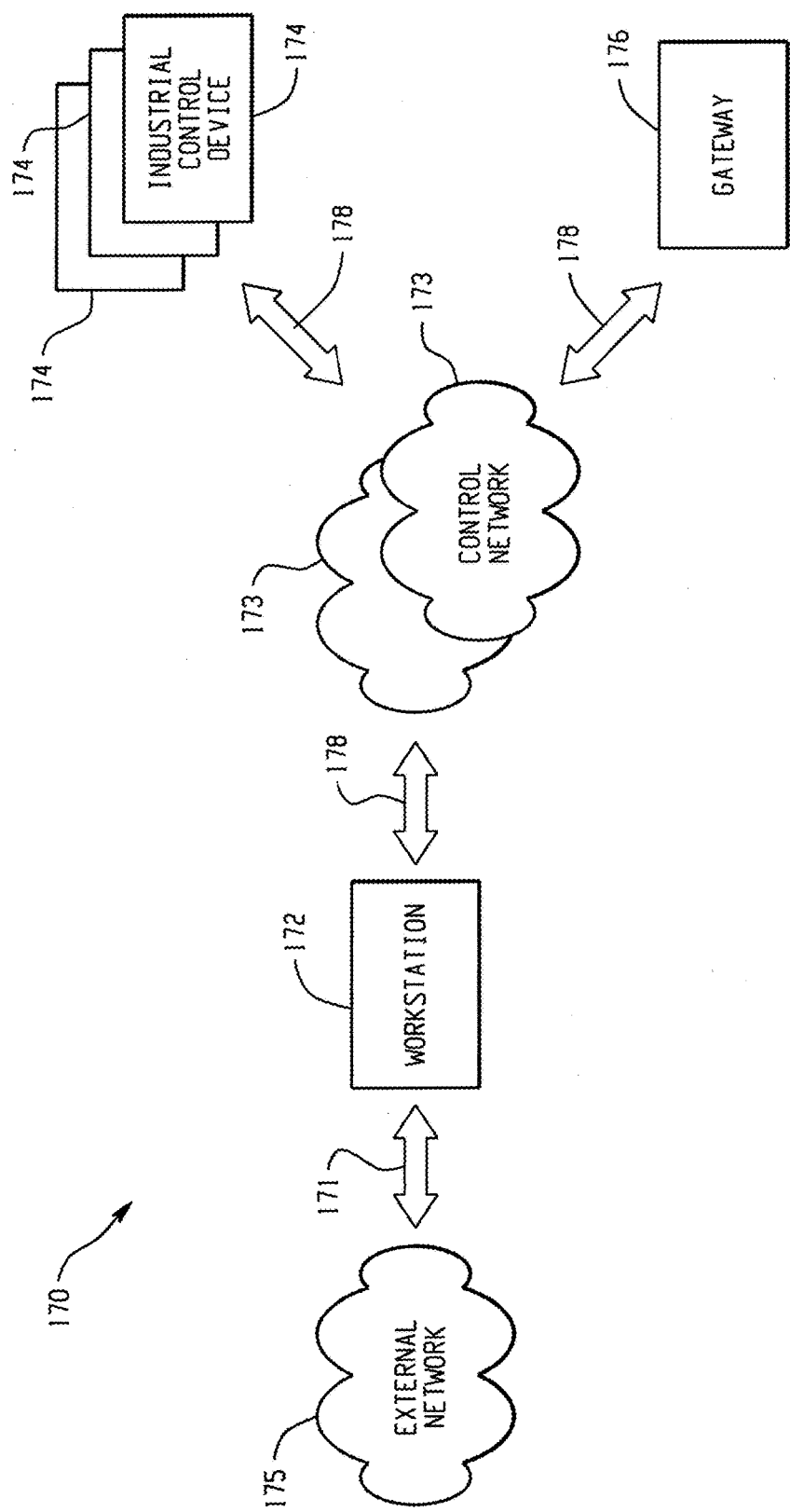
FIG. 5 shows an example of the architecture of a distributed industrial process control system which includes an industrial device according to an exemplary embodiment of this disclosure.

With reference to FIG. 5, shown is an example of the architecture of a distributed industrial process control system which includes an industrial device according to an exemplary embodiment of this disclosure.

In the Industrial Process Control System shown in FIG. 5, a distributed architecture is designed to be used in different SIL (Safety Integrity Level) environments, so that if a high SIL is required it can be provided, but if a low SIL is all that is needed, the system can be reduced in complexity in order to reduce unnecessary extra costs.

An exemplary Industrial Process Control System 170, comprises a workstation 172 one or more controllers 174 and a gateway 176. The workstation 172 communicates with the controllers 174 and the gateway 176 via Ethernet connections 178 to one or more control networks 173. Multiple Ethernet connections 178 provide redundancy to improve fault tolerance. The workstation 172 may be connected via a conventional Ethernet connection 171 to another external network 175.

An exemplary controller 174 will now be described in more detail with reference to FIGS. 6 and 7.

Figure 6:
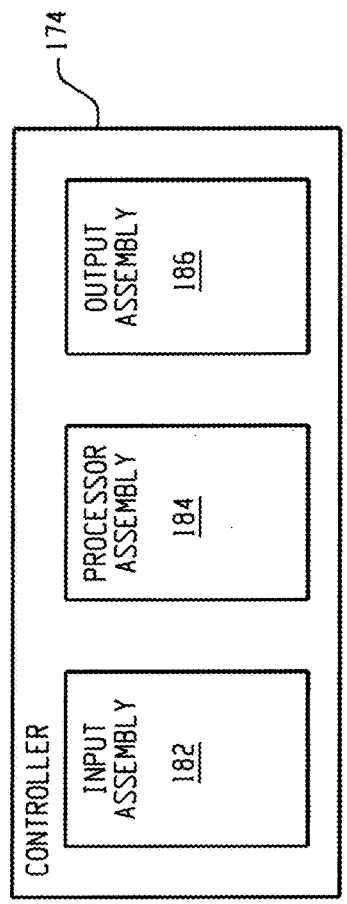
FIG. 6 is a block diagram of an industrial controller/device according to an exemplary embodiment of this disclosure.

FIG. 6 illustrates a schematic diagram of the controller 174 comprising an input assembly 182, a processor assembly 184 and an output assembly 186. In this schematic illustration, the input assembly 182 and output assembly 186 are on different backplanes but they may equally well share a single backplane.

Assemblies 182, 184, 186 are created from one or more communications backplane portions which have three slots to accommodate up to three modules together with termination assemblies which have one two or three slots, and which interface to field sensors and transducers. A termination assembly may straddle two contiguous backplane portions. A module comprises a plug in card with multiple connectors for plugging onto a communications backplane and a termination assembly.

It will be appreciated that having three slots in a communications backplane portion is one design option and other design options with greater (or fewer) slots are possible without departing from the scope of this disclosure as defined in the appended claims.

Figure 7:
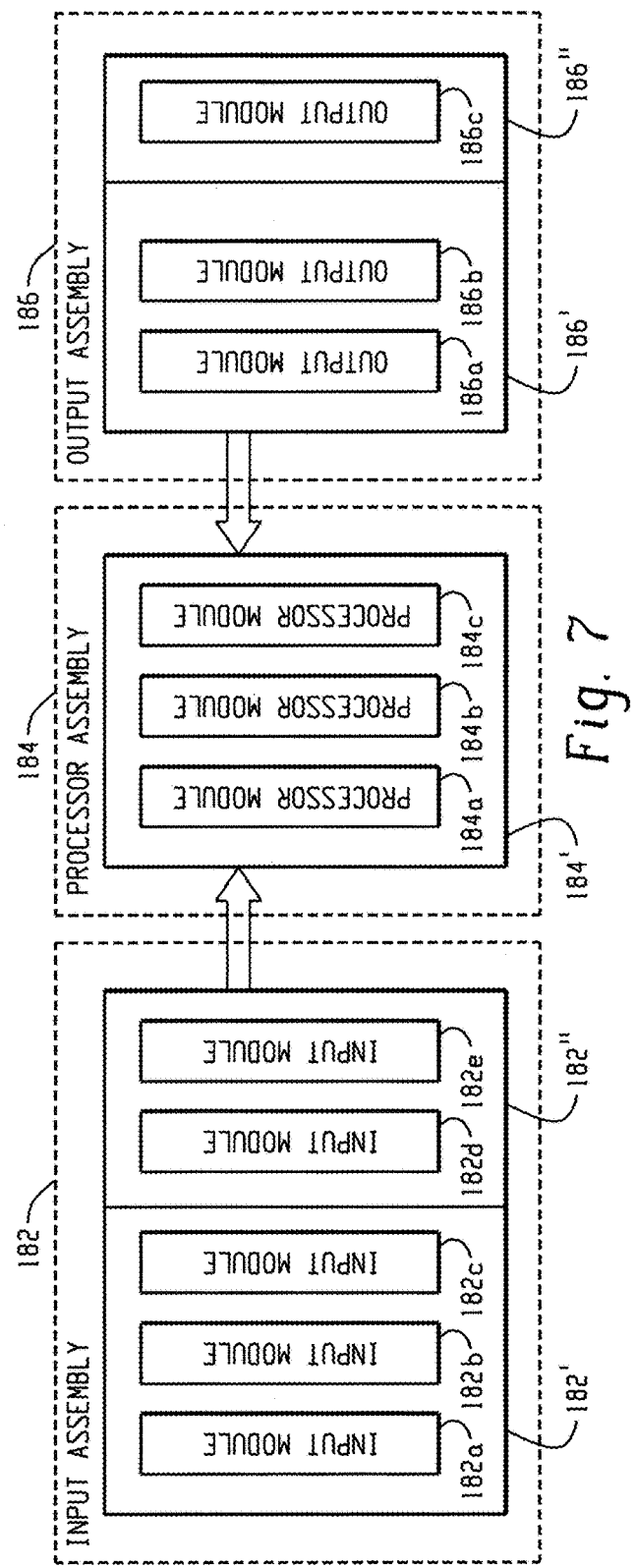
FIG. 7 is another block diagram of an industrial controller/device according to an exemplary embodiment of this disclosure.

FIG. 7 illustrates a possible physical configuration of the controller 174. According to this exemplary embodiment, the input assembly 182, output assembly 186 and processor assembly 184 are physically separated from one another by grouping the modules of different types onto separate communications backplanes.

In the example shown, the input assembly 182 comprises two communications backplane portions, 182', 182". The first backplane portion 182' has a triplex input termination assembly and three input modules 182a, 182b, 182c, the second backplane portion 182" has a duplex input termination assembly 182" and two input modules 182d, 182e. The processor assembly 184 comprises a single processor backplane portion 184' having three processor modules 184a, 184b and 184c. The output assembly 186 comprises two backplane portions 186', 186". The first backplane portion 186' has a duplex output termination assembly with two output modules 186a, 186b and the second backplane portion 186" has a simplex output termination assembly with a single output module 186c.

Figure 8:
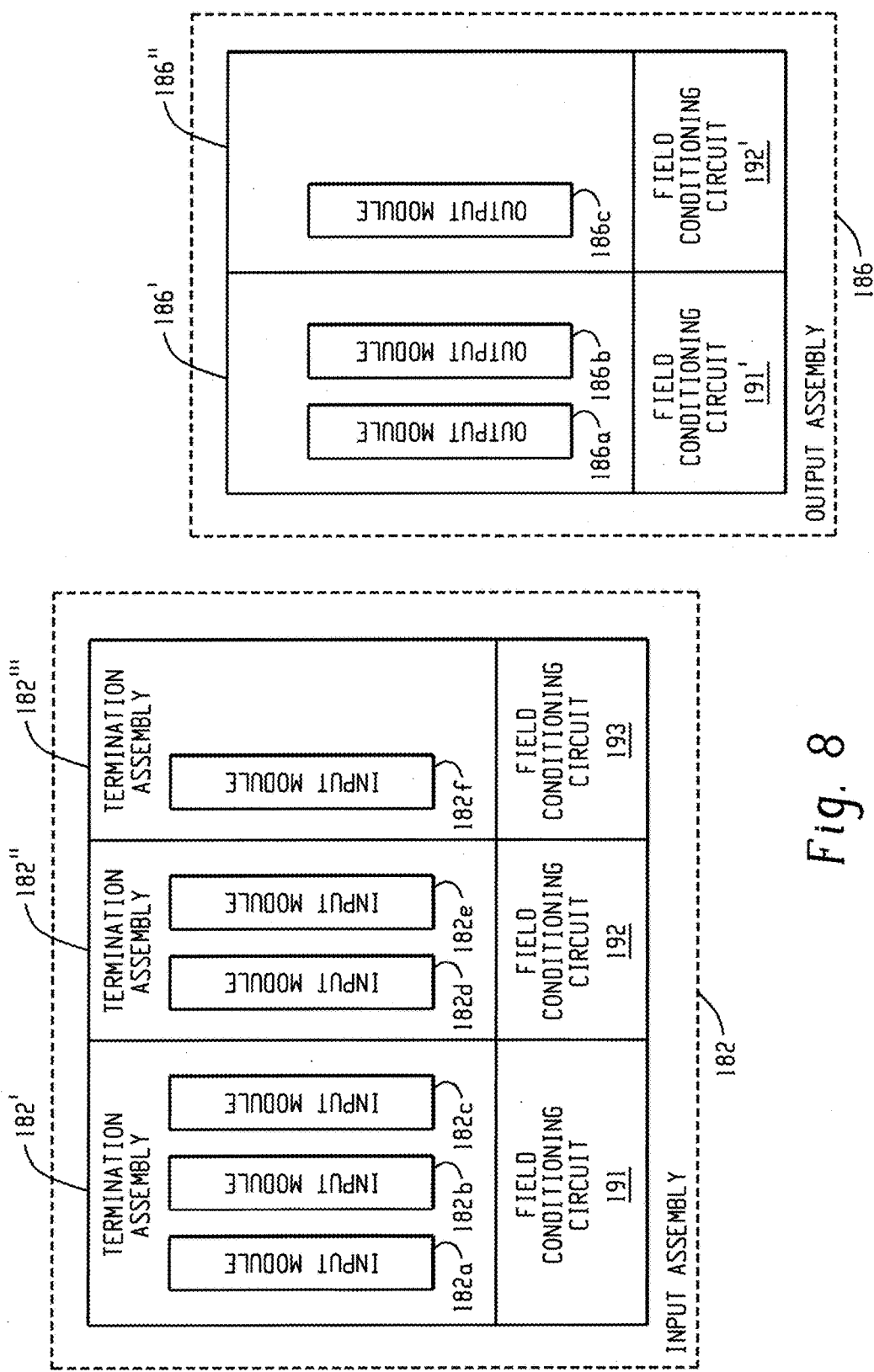
FIG. 8 is a block diagram including possible configurations of an input assembly and output assembly according to an exemplary embodiment of this disclosure.

The flexibility of the input assembly 182, will now be described, in more detail with reference to FIG. 8.

An input assembly 182 comprises one or more backplane portions and termination assemblies 182' 182" 182'" etc. For example, a triplex portion 182' having three modules 182a, 182b, 182c might be used for high availability requirement, a duplex portion 182" having two modules 182d, 182e might be provided for fault tolerant applications and a simplex portion 182'" with a single module 182f might be provided for failsafe applications. The termination assemblies may be provided with different types of field conditioning circuits. For example assembly 182' may be provided with a 184V DC field conditioning circuit 191, assembly 182" may be provided with a 120V DC field conditioning circuit 192, and assembly 182'" may be provided with a 4-20 mA field conditioning circuit 193. Similarly possible configurations are shown for an output assembly 186. It will be appreciated that numerous configurations of backplane portions and termination assemblies with various different numbers of modules and various different types of field conditioning circuits are possible and this disclosure is not limited to those shown in these examples.

Where an assembly provides more than one module for redundancy purposes it is possible to replace a failed module with a replacement module whilst the industrial process control system is operational which is also referred to herein as online replacement (i.e., replacement is possible without having to perform a system shutdown). Online replacement is not possible for a simplex assembly without interruption to the process. In this case various "hold last state" strategies may be acceptable or a sensor signal may also be routed to a different module somewhere else in the system.

The processor assembly configures a replacement processor module using data from a parallel module before the replacement module becomes active.

The field conditioning circuits 191, 192, 193 transform a signal received from a sensor monitoring industrial process control equipment to a desired voltage range, and distribute the signal to the input modules as required. Each field conditioning circuit 191, 192, 193 is also connected to field power and field return (or ground) which may be independently isolated on a channel by channel basis from all other grounds, depending on the configuration of the input termination assembly. Independent channel isolation is the preferred configuration because it is the most flexible. The field conditioning circuits 191, 192, 193 comprise simple non active parts and are not online replaceable.

Figure 9:
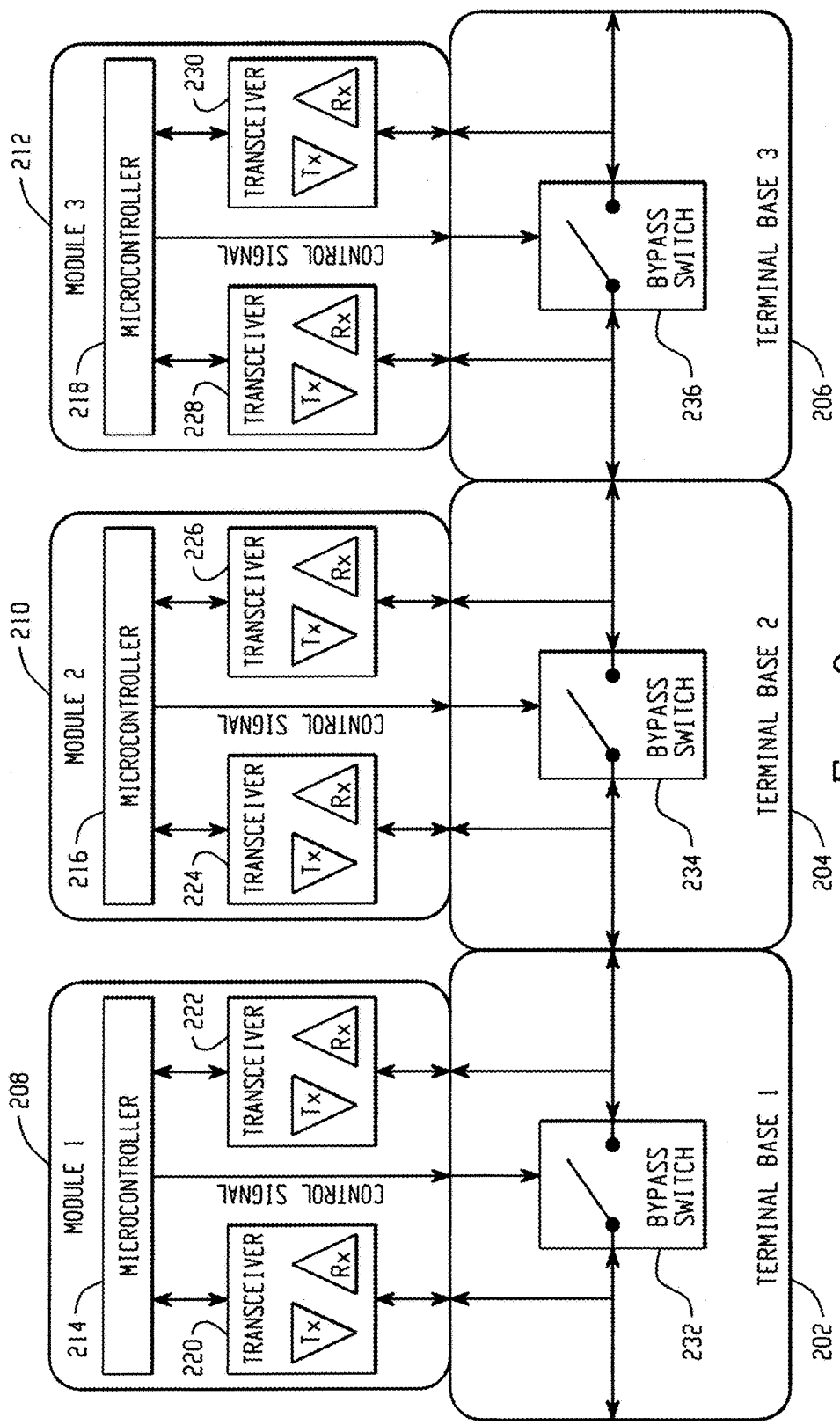
FIG. 9 shows an industrial control device including a point-to-point backplane/module arrangement according to an exemplary embodiment of this disclosure, prior to a RIUP module removal operation.

With reference to FIG. 9, shown is an industrial control device including a point-to-point backplane/module arrangement according to an exemplary embodiment of this disclosure, prior to a RIUP module removal operation, i.e., a normal mode of operation. The industrial control device includes Terminal Base 1 202, Terminal Base 2 204, Terminal Base 3 206, Module 1 208, Module 2 210, and Module 3 212.

Module 1 208 includes a microcontroller 214, a first transceiver 220, a second transceiver 222 and a control signal. Module 1 208 is operatively coupled to a point-to-point backplane via terminal base 1 202 which includes bypass switch 232.

Module 2 210 includes a microcontroller 216, a first transceiver 224, a second transceiver 226 and a control signal. Module 2 210 is operatively coupled to the point-to-point backplane via terminal base 2 204 which includes bypass switch 234.

Module 3 212 includes a microcontroller 218, a first transceiver 228, a second transceiver 230 and a control signal. Module 3 212 is operatively coupled to the point-to-point backplane via terminal base 3 206 which includes bypass switch 236.

As shown in FIG. 9, during the normal mode of operation point-to-point data communications between modules 208, 210 and 218 do not include routing data through bypass switch 232, 234 and 236, which are open. Data communications between module 208 and 210 are provided by transceiver 222 and 224. Data communications between module 210 and 212 are provided by transceiver 226 and 228.

Figure 10:
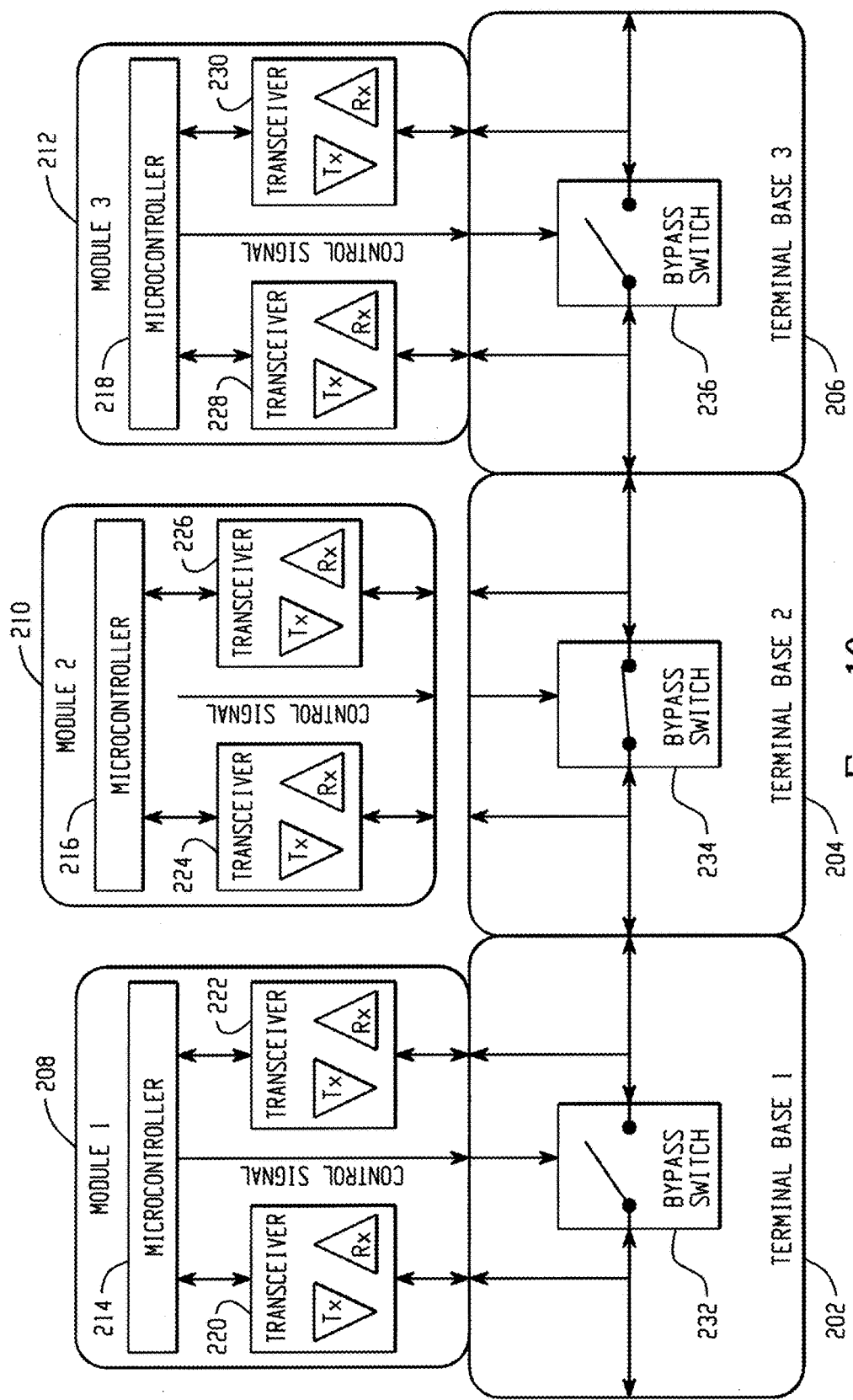
FIG. 10 shows an industrial control device including a point-to-point backplane/module arrangement according to an exemplary embodiment of this disclosure, prior to a RIUP operation, i.e., Terminal Base 2 is not engaged with a module.

With reference to FIG. 10, shown is the industrial control device including a point-to-point backplane/module arrangement according to an exemplary embodiment of this disclosure, prior to a RIUP operation, i.e., Terminal Base 2 is not engaged with a module.

As shown in FIG. 10, during a module removal mode of operation, point-to-point data communications between module 208 and 212 is provided by bypass switch 234 after module 210 is removed from the terminal base 204. In other words, after module 210 is removed from terminal base 2, bypass switch 234 closes and module 214 communicates with module 212, via transceiver 222 and 228, which maintains a point-to-point data communication configuration.

Figure 11:
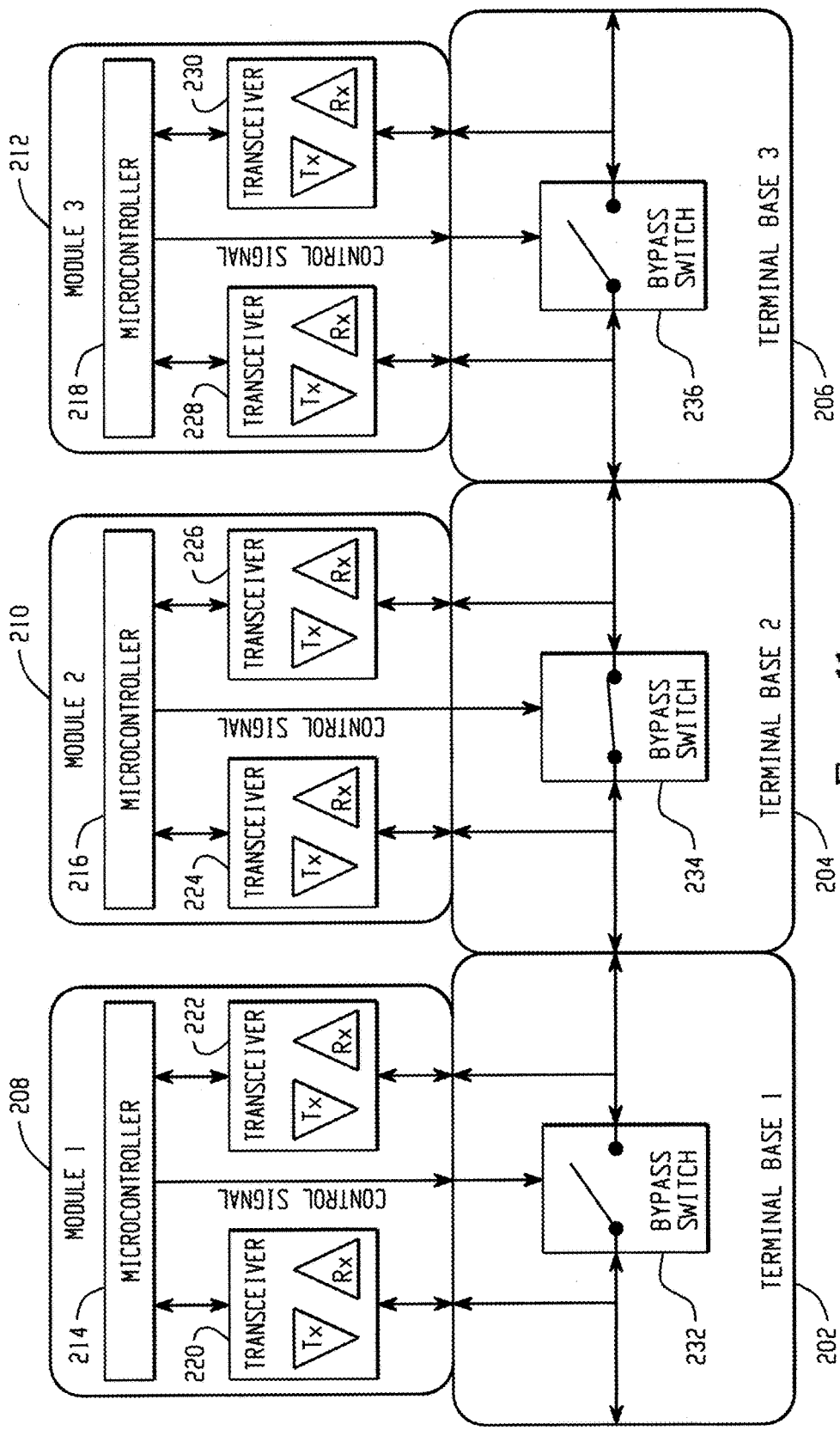
FIG. 11 shows the industrial control device of FIG. 10, during a RIUP operation where module 2 is inserted to Terminal Base 2.

As shown in FIG. 11, after module 210 is inserted into terminal base 204, bypass switch 234 remains closed until module 210 completes the execution of an initialization routine. During the boot up of module 210, module 208 and module 212 continue to communicate via transceiver 222, bypass switch 234 and transceiver 228.

With reference to FIG. 11, shown is the industrial control device of FIG. 10, during a RIUP operation where module 2 is inserted to Terminal Base 2.

Figure 12:
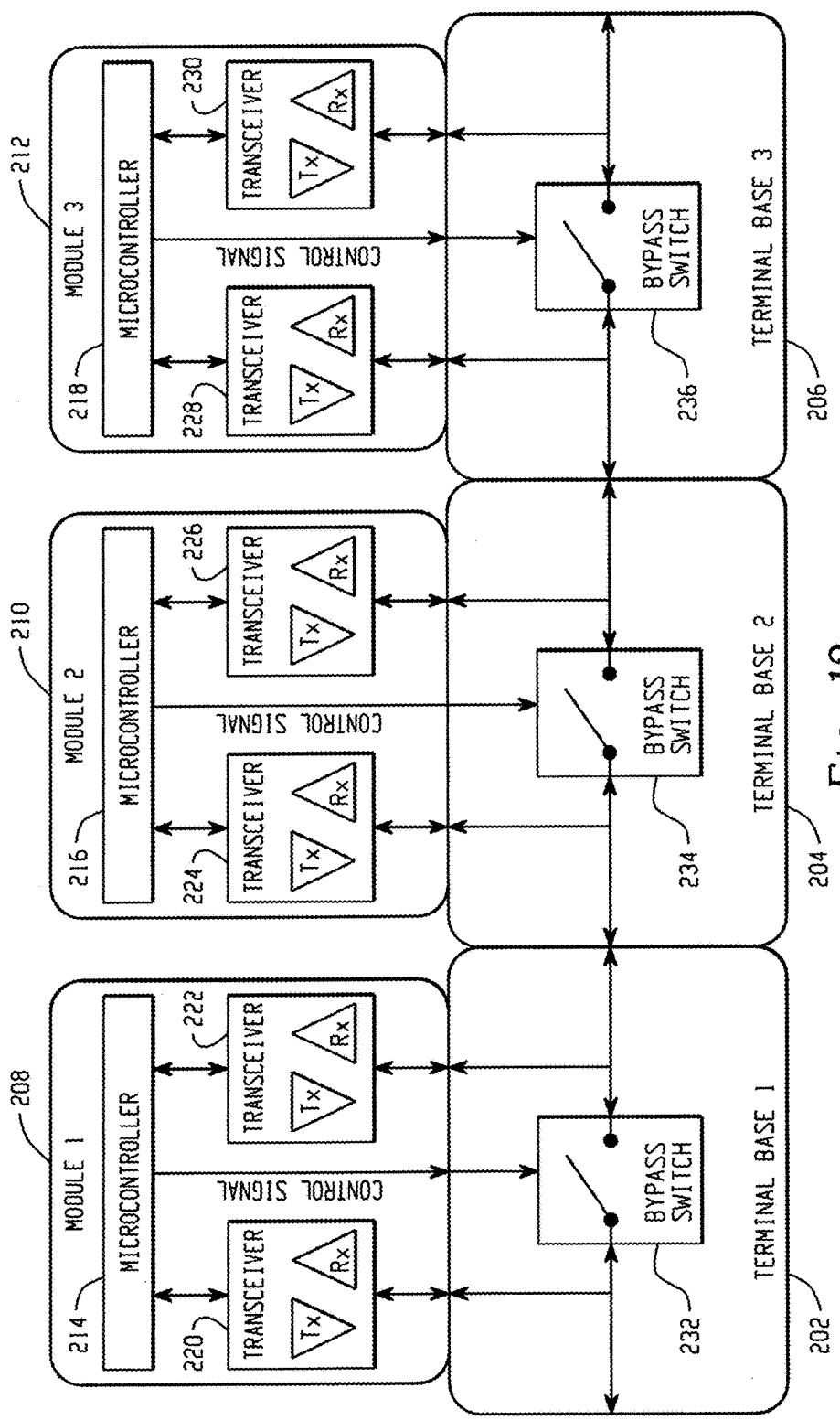
FIG. 12 shows the industrial control device of FIG. 10, after the completion of the RIUP operation where module 2 is inserted to Terminal Base 2 and module 2 microcontroller has executed an initialization routine.

With reference to FIG. 12, shown is the industrial control device of FIG. 10, after the completion of the RIUP operation where module 2 is inserted to Terminal Base 2 and module 2 microcontroller has executed an initialization routine.

As shown in FIG. 12, after module 210 has completed the execution of an initialization routine, bypass switch 234 is opened via a control signal line operatively associated with microcontroller 216. In other words, after the execution of an initialization routine by module 210, point-to-point data communications is restored between module 208 and 210 via transceivers 222 and 224, and point-to-point data communications is restored between module 210 and 212 via transceivers 226 and 228.

Figure 13:
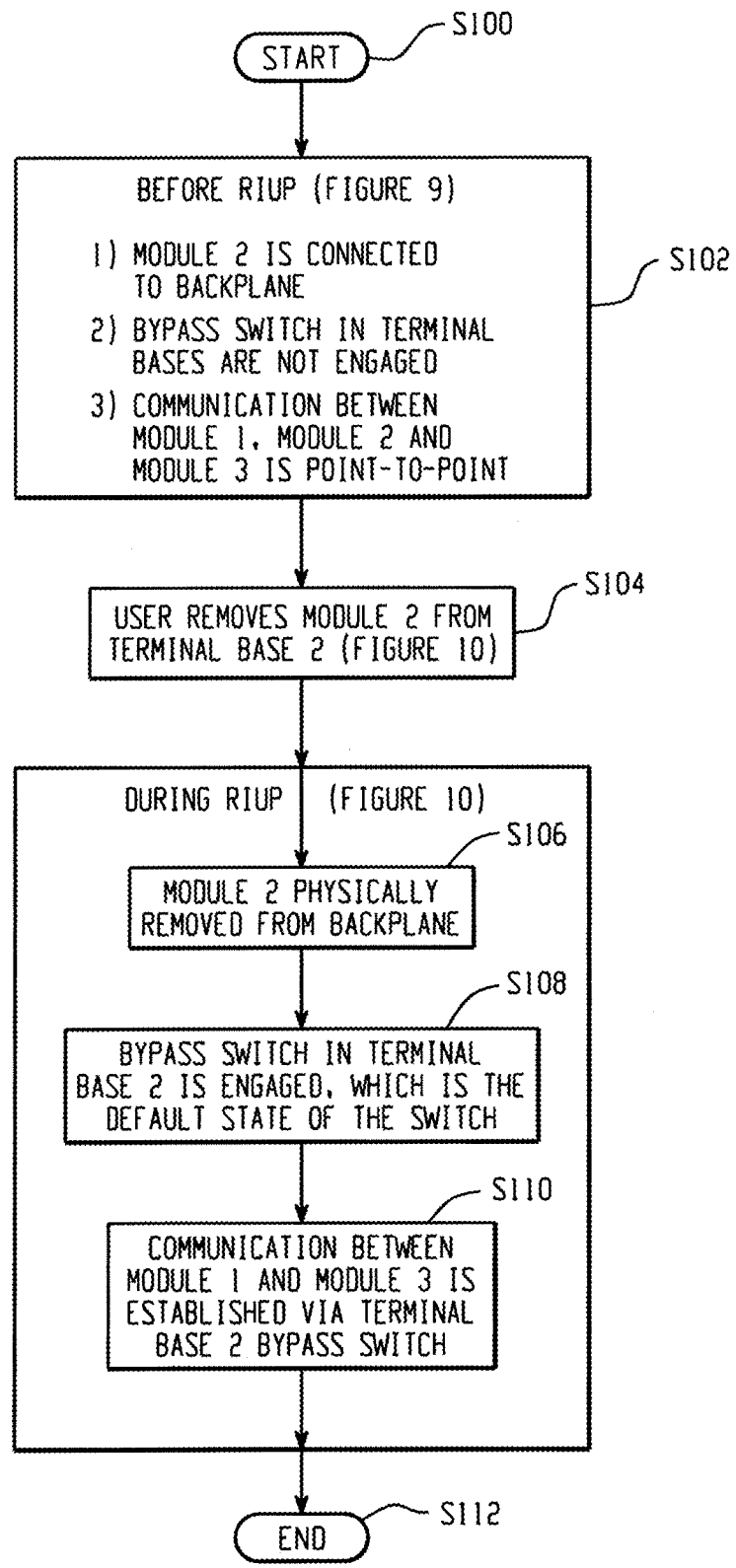
FIG. 13 is a flow chart of a method of executing a point-to-point backplane RIUP operation to remove a module according to an exemplary embodiment of this disclosure.

With reference to FIG. 13, shown is a flow chart of a method of executing a point-to-point backplane RIUP operation to remove a module according to an exemplary embodiment of this disclosure.

The method starts at S100.

Next at step S102, before RIUP (see FIG. 9), 1) Module 2 is connected to backplane; 2) bypass switch in terminal bases are not engaged; and 3) communication between Module 1, Module 2 and Module 3 is point-to-point.

Then at step S104, the user removes Module 2 from terminal base 2 (see FIG. 10).

Next at step S106, During RIUP (FIG. 10), Module 2 is physically removed from backplane.

Next at step S108, bypass switch in Terminal Base 2 is engaged which is the default state of Terminal Base 2 bypass switch.

Next at step S110, communication between Module 1 and Module 3 is established via Terminal Base 2 bypass switch.

Finally, at step S112 the method ends.

Figure 14:
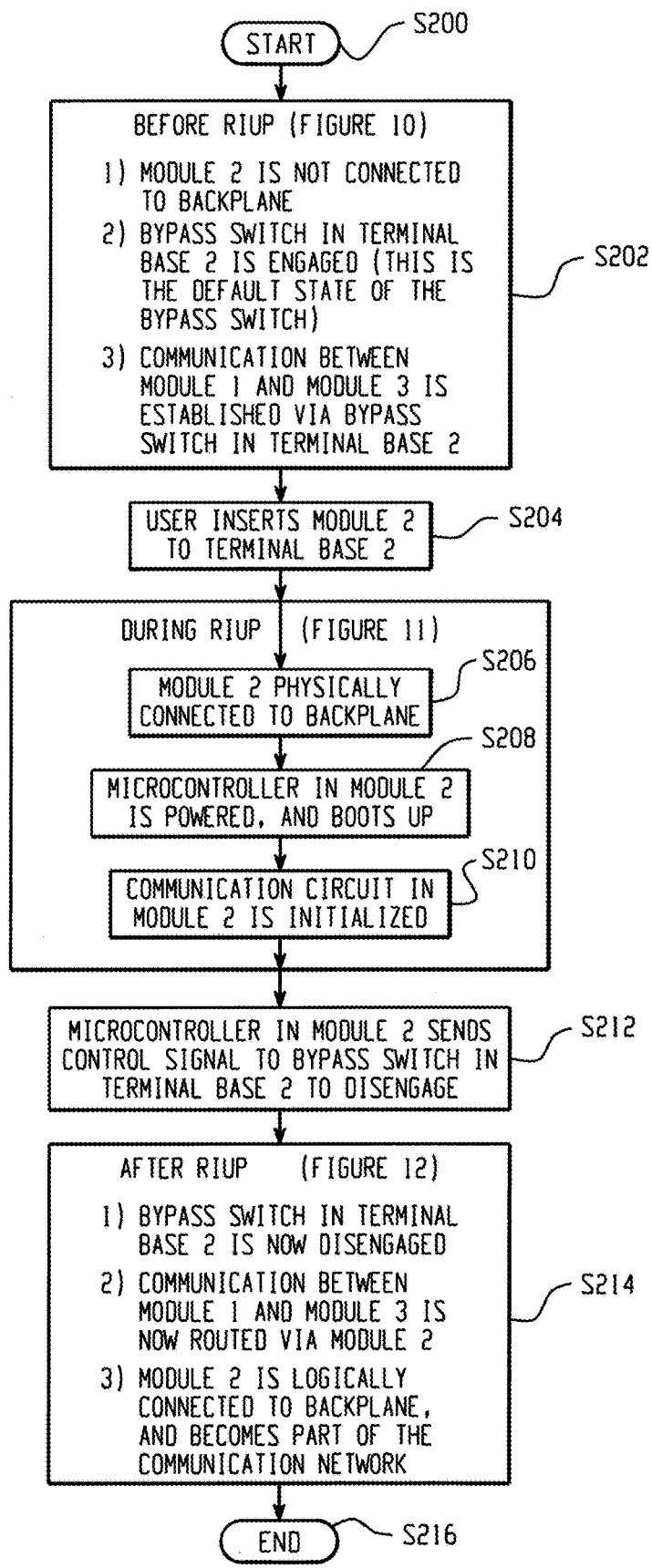
FIG. 14 is a flow chart of a method of executing a point-to-point backplane RIUP operation according to an exemplary embodiment of this disclosure.

With reference to FIG. 14, shown is a flow chart of a method of executing a point-to-point backplane RIUP operation according to an exemplary embodiment of this disclosure.

The method starts at S200.

Next at S202, before RIUP (FIG. 10), 1) Module 2 is not connected to backplane; 2) bypass switch in Terminal Base 2 is engaged (this is the default state of the bypass switch); and 3) communication between Module 1 and Module 3 is established via bypass switch in Terminal Base 2.

Then at S204, the user inserts Module 2 to Terminal Base 2.

Next, at S206, during RIUP (FIG. 11), Module 2 is physically connected to backplane.

Then at S208, the microcontroller in Module 2 is powered, and boots up.

Next at S210, communication circuit in Module 2 is initialized.

Next at S212, the microcontroller in Module 2 sends a control signal to bypass switch in Terminal Base 2 to disengage.

Next at S214, after RIUP (FIG. 12), 1) the bypass switch in Terminal Base 2 is now disengaged; 2) communication between Module 1 and Module 3 is now routed via Module 2; and 3) Module 2 is logically connected to backplane, and becomes part of the communication network.

Finally, at step S216, the method ends.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

In the preceding specification, various embodiments have been described with reference to the accompanying drawings. It will, however, be evident that various modifications and changes may be made thereto, and additional embodiments may be implemented, without departing from the broader scope of this disclosure as set forth in the claims that follow. The specification and drawings are accordingly to be regarded in an illustrative rather than restrictive sense.

The following is claimed:

1. An industrial control device comprising:
   a plurality of I/O (Input/Output) modules, each I/O module including a microcontroller operatively connected to a first data communication channel, a second data communication channel and a single RIUP (Removable and Insertion Under Power) control signal line, wherein the first data communication channel, the second data communication channel and the single RIUP control signal line in cide backplane interface contacts;
   a point-to-point backplane removably coupled to each of the plurality of I/O modules, the backplane including a plurality of bypass data switches, a single bypass data switch of the plurality of bypass data switches operatively associated with a single respective I/O module RIUP control signal line to open and close the single bypass data switch and each bypass data switch including a first switch contact operatively associated with the first data communication channel and a second switch contact associated with the second data communication channel,
   wherein removal of an I/O module from the backplane causes the respective single bypass data switch to close and route data communications from the first switch contact to the second switch contact, and the insertion of an I/O module to the backplane causes the respective I/O module microcontroller to execute an initialization routine which outputs a control signal directly to the single bypass data switch to open thereby connecting the backplane first data channel to the respective I/O module first data channel contact exclusive of being routed to the second switch contact and connecting the backplane second data channel to the respective I/O module second data channel contact exclusive of being routed to the first switch contact.

2. The industrial control device according to claim 1, wherein each of the plurality of I/O modules include a first data transceiver operatively associated with the first data communication channel and a second data transceiver operatively associated with the second data communication channel.

3. The industrial control device according to claim 1, wherein the bypass data switches are one of a solid state device and an electrical relay device.

4. The industrial control device according to claim 1, further comprising:
   a data communications module adapter operatively connected to the backplane and operatively connected to communicate with all inserted I/O modules.

5. The industrial control device according to claim 1, wherein the first data communication channel and the second data communication channel are Ethernet based.

6. The industrial control device according to claim 1, wherein the backplane includes a plurality of mounting bases, each mounting base operatively associated with a respective I/O module.

7. The industrial control device according to claim 6, wherein the plurality of mounting bases are active powered mounting bases.

8. The industrial control device according to claim 1, wherein the backplane includes a plurality of backplane modules operatively connected to provide the backplane, each backplane module including one or more mounting bases.

9. A control module for an industrial device, the control module comprising:
   a microcontroller operatively connected to a first data communication channel, a second data communication and a single RIUP (Removable and Insertion Under Power) control signal line; and
   a mounting base interface configured to interface the first data communication channel, the second communication channel and the single RIUP control signal line to an associated mounting base,
   wherein the microcontroller is configured to execute instructions to directly control a single bypass data switch operatively associated with the single RIUP control signal line, the single bypass data switch operating in a first state to provide point-to-point data communications between two other control modules adjacent to the control module when the control module is removed from the associated mounting base, and a second state to provide point-to-point data communications between the control module and the two other control modules adjacent to the control module when the control module is inserted to the mounting base.

10. The control module for an industrial device according to claim 9, wherein the control module is configured to execute an initialization routine after insertion of the control module to the associated mounting base and the control module is configured to directly control the single bypass data switch, via the single RIUP control signal line, to switch to the second state after the execution of the initialization routine.

11. The control module for an industrial device according to claim 10, wherein the first communication channel includes a first data transceiver and the second communication channel includes a second data transceiver.

12. The control module for an industrial device according to claim 9, wherein the first data channel and the second data channel are Ethernet based.

13. The control module for an industrial device according to claim 9, wherein the associated mounting base is an active powered mounting base.

14. A point-to-point backplane for an industrial control device comprising:
- a plurality of mounting bases configured to removably couple a plurality of respective I/O (Input/Output) modules, each mounting base including a single bypass data switch operatively associated with a respective single I/O module RIUP (Removable and Insertion Under Power) control signal line to open and close the single bypass data switch and each single bypass data switch including a first switch contact operatively associated with a first data communication channel and a second switch contact operatively associated with a second data communication channel.

15. The point-to-point backplane for an industrial control device according to claim 14, wherein the plurality of mounting bases are active power mounting bases.

16. The point-to-point backplane for an industrial control device according to claim 14, wherein the first data communication channel and the second data communication channel are Ethernet based.

17. The point-to-point backplane for an industrial control device according to claim 14, wherein the first data communication channel includes a first data transceiver and the second data communication channel includes a second data transceiver.

18. The point-to-point backplane for an industrial control device according to claim 14, wherein the backplane includes a plurality of backplane modules operatively connected to provide the point-to-point backplane, each backplane module including one or more of the plurality of mounting bases.

19. The point-to-point backplane for an industrial control device according to claim 14, wherein the single bypass data switch is one of a solid state device and an electrical relay device.

20. The point-to-point backplane for an industrial control device according to claim 14, wherein the backplane is configured to operatively connect a data communications module which communicates with the plurality of respective I/O modules.

\* \* \* \* \*